United States Patent [19]

Semanaz et al.

[11] 4,292,500
[45] Sep. 29, 1981

[54] MODULAR, CONSTRUCTIONAL HEATING UNIT

[75] Inventors: Daniel Semanaz, Vernaison; Robert Cassat, Ternay, both of France

[73] Assignee: Rhone-Poulenc Industries, Paris, France

[21] Appl. No.: 940,364

[22] Filed: Sep. 7, 1978
(Under 37 CFR 1.47)

Related U.S. Application Data

[63] Continuation-in-part of Ser. No. 914,922, Jun. 12, 1978, abandoned, and a continuation-in-part of Ser. No. 828,603, Aug. 29, 1977, abandoned, which is a continuation of Ser. No. 813,353, Jul. 6, 1977, abandoned.

[30] Foreign Application Priority Data

Sep. 7, 1977 [FR] France ............................... 77 27676

[51] Int. Cl.³ .......................... F24H 9/02; H05B 3/02
[52] U.S. Cl. ................................. 219/345; 219/213; 219/354; 219/523; 219/548
[58] Field of Search ............... 219/213, 345, 354, 390, 219/521, 523, 544, 541, 548, 552; 338/63

[56] References Cited

U.S. PATENT DOCUMENTS

| 1,098,436 | 6/1914 | Hadaway, Jr. ..................... 219/213 |
| 2,018,293 | 10/1935 | Williams et al. .................... 219/213 |
| 2,138,217 | 11/1938 | Sutter ................................. 219/345 |
| 2,855,495 | 10/1958 | Grant .................................. 338/63 X |
| 3,053,789 | 9/1962 | Trainor ............................. 219/354 X |
| 3,095,491 | 6/1963 | Deacon ............................ 219/345 X |
| 3,234,355 | 2/1966 | Freeman ............................. 219/213 |
| 3,303,324 | 2/1967 | Appleman .......................... 219/345 |
| 3,509,317 | 4/1970 | Valsamakis et al. ................ 219/258 |
| 3,668,368 | 6/1972 | Moldskred ......................... 219/213 |

FOREIGN PATENT DOCUMENTS

| 1255899 | 12/1967 | Fed. Rep. of Germany ...... 219/213 |
| 2338379 | 2/1975 | Fed. Rep. of Germany . |
| 1044904 | 11/1953 | France . |
| 2117535 | 7/1972 | France . |
| 2289852 | 5/1975 | France . |
| 2358075 | 2/1978 | France . |
| 2371117 | 6/1978 | France . |
| 7727676 | 7/1978 | France . |
| 2395661 | 1/1979 | France . |
| 196306 | 6/1938 | Switzerland ........................ 219/213 |
| 353098 | 5/1961 | Switzerland ........................ 219/523 |
| 654677 | 6/1951 | United Kingdom . |
| 964174 | 7/1960 | United Kingdom ............... 219/213 |
| 988476 | 4/1964 | United Kingdom ............... 219/213 |
| 1402560 | 8/1975 | United Kingdom . |

Primary Examiner—Volodymyr V. Mayewsky
Attorney, Agent, or Firm—Burns, Doane, Swecker & Mathis

[57] ABSTRACT

A modular, constructional heating unit, useful, e.g., for the fabrication of interior partitions, is comprised of a panel member provided with at least one elongate rectilinear cavity, the longitudinal axis of such cavity being parallel to a face surface of the panel, said cavity being exteriorly communicating at one or both of its ends, and said cavity containing an electrical heating element.

31 Claims, 5 Drawing Figures

MODULAR, CONSTRUCTIONAL HEATING UNIT

CROSS-REFERENCE TO RELATED APPLICATIONS

This application is a continuation-in-part of our earlier copending application, Ser. No. 828,603, filed Aug. 29, 1977, now abandoned, itself a continuation of our abandoned application, Ser. No. 813,353, filed July 6, 1977. This application is also a continuation-in-part of our earlier copending application Ser. No. 914,922, filed June 12, 1978, now abandoned. Each of the noted applications is hereby expressly incorporated herein by reference in its entirety and relied upon.

BACKGROUND OF THE INVENTION

The present addition relates to a modular heating panel or constructional heating unit which can be utilized simply and efficiently, especially for heating rooms.

One object of the present invention is to provide a means of heating which displays great flexibility in use and which is highly efficient and makes it possible to judiciously distribute the sources or points of heat.

A further object of the invention is to provide an easy means for producing heating partitions or panels while at the same time avoiding any obstruction of the room to be heated which is delimited or defined by said partitions.

SUMMARY OF THE INVENTION

Thus, the present invention relates to modular, constructional heating units, characterized in that same comprise a panel provided with at least one rectilinear cavity, the axis of which cavity being parallel to the greater face surfaces of the panel and such cavity communicating to the exterior of the panel at one or more of its ends, the said cavity containing or housing an electrical heating element.

By the term "panel", there is intended a solid body having two large, parallel or essentially parallel face surfaces and having a relatively small thickness compared with at least one of the dimensions of the much larger dimensional face surfaces. The term "panel edges" is intended to connote the sides of a panel which are different from the larger face surfaces. The expression "room partition" includes both the ceiling and the walls.

The panels employed in the invention can be produced from one of the commonly employed constructional materials, such as cement, concrete, baked-clay brick, plaster and combinations of these components with other constituents of most diverse type (agglomerates). However, in the present invention, plaster-based constructional units, whether the plaster be of natural or synthetic origin, are preferred and, indeed, define the most preferred embodiment of the invention. Plaster is the most suitable material for producing the panels according to the invention, especially because of the ease with which it is molded into the desired shape, even industrially; furthermore, plaster panels directly form partitions having a "finished" appearance which does not require any additional finishing operation.

BRIEF DESCRIPTION OF THE DRAWINGS

In order to provide a better understanding of the invention.

FIG. 1 is a perspective view of a constructional heating element in a vertical position according to the invention;

FIG. 2 is a horizontal cross-sectional view, along the plane (II) of the constructional unit of FIG. 1; the plane (II) being perpendicular to the face surface 1 and to the axes of the cavities;

FIG. 3 is a perspective view of two construction units (in a vertical position) which are joined together and which are of a different type from the units of FIG. 1;

FIG. 4 is a horizontal cross-sectional view along the plane (IV) of FIG. 3, said plane (IV) being perpendicular to the face surfaces 15 and to the axes of the cavities;

FIG. 5 is a perspective view of a portion of a partition consisting of constructional units such as that of FIG. 1;

DETAILED DESCRIPTION OF THE INVENTION

Figure 1:
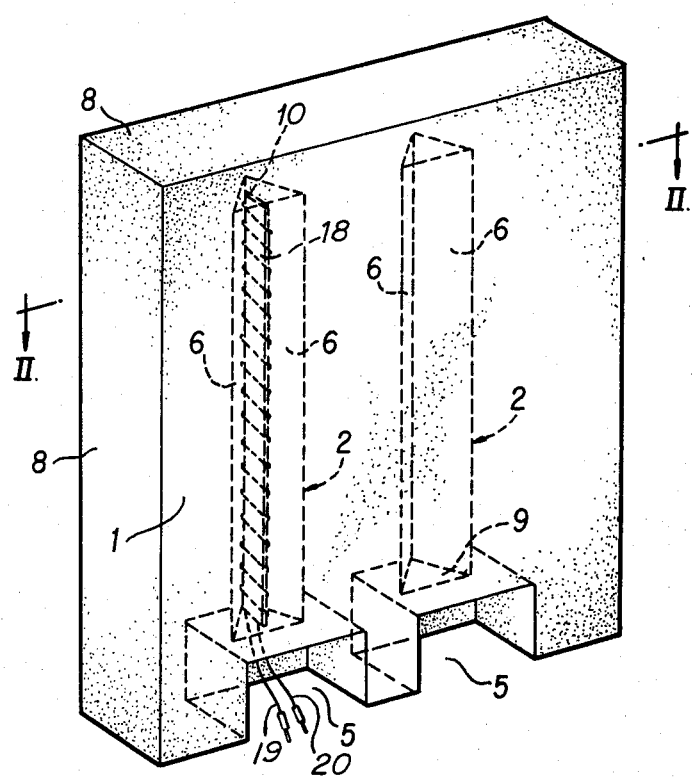
FIGS. 1 to 5 are given for the purpose of illustrating embodiments and a particular application, by way of non-limiting examples and with no fixed scale.

More particularly, the constructional unit of FIG. 1 has the shape of a rectangular parallelepiped and thus possesses two large dimensional face surfaces, one of which is noted by the reference numeral 1, and 4 edges, two of which are noted by the reference numeral 8. Two rectilinear cavities, indicated as 2, are parallel to each other and parallel to the large dimensioned surface 1 of the panel and to two of its sides 8. These cavities, triangular in cross section, as shown by the base 9, have two sides indicated by the numeral 6. These sides, in contradistinction to the third, are not parallel to the large dimensioned face surfaces of the panel. The constructional unit is further provided with two recesses 5 which are located at the downward ends of the cavities; these recesses are intended to facilitate the positioning or withdrawal of the electrical heating element 10. This heating element 10 consists of a strip 18 of flexible material, on the surface of which there are two electrically resistant webs; the ends of the wires 19 and 20 of these webs are provided with a means which allows them to be connected to a source of electrical energy, e.g., a simple plug.

Figure 2:
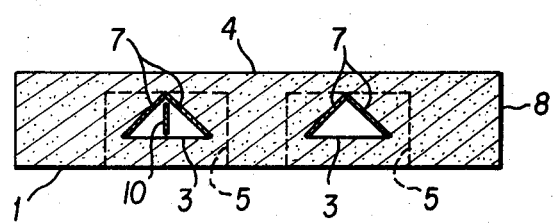

Being a cross section of the element of FIG. 1, FIG. 2 makes it possible to show more clearly the arrangement and the contents of the cavities. It is seen that these cavities have a face 3 which is parallel to the large dimensioned face surfaces 1 and 4 of the panel. This face 3 is located near the face surface 1 of the panel which will form or define the wall of the heated room; the electrical heating element has been arranged perpendicular to the face 3, although other arrangements can be adopted; this particular arrangement is especially advantageous in the case of radiant heating elements, since these pass virtually all of their radiation energy onto the reflectors 7 which, therefore, return this energy through the face 3 of the cavity and the face 1 of the panel.

Figure 3:
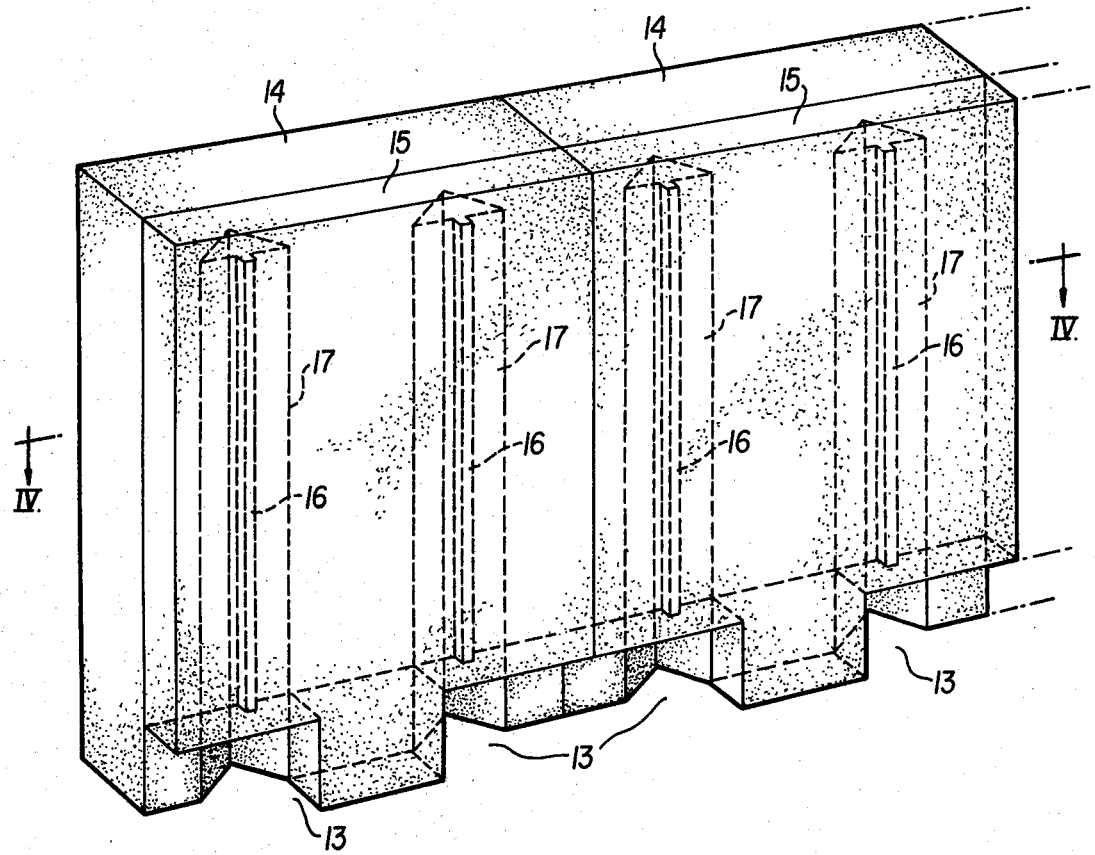
Figure 4:
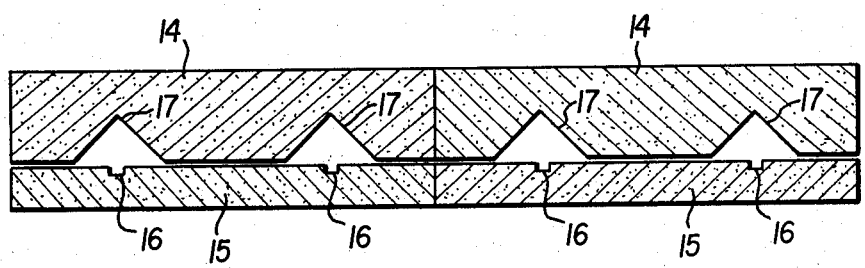

FIG. 3 shows, at the same time, constructional units of another type and the manner in which two such units are joined. FIG. 4 reflects the exact arrangements. These particular constructional units have the particular characteristic in that the recesses 13 are no longer only at the border of a large face surface of the panel but are in a corner, so that two recesses of two different but adjoining panels together form a single recess. A further particular characteristic of the panels shown is that they are formed from two plates 14 and 15; the grooves 17, which form the rectilinear cavities in the finished panel, are inscribed in the plate 14; other grooves 16, which are much smaller and in which the electrical heating element 10, which is not shown, is to be inserted, are also inscribed in the plate 15; the method of joining the two construction units has also not been shown, but it is quite obvious that they are joined or welded by any means which is known to the building industry. The most common method of joining two plaster panels also involves the use of plaster.

Figure 5:
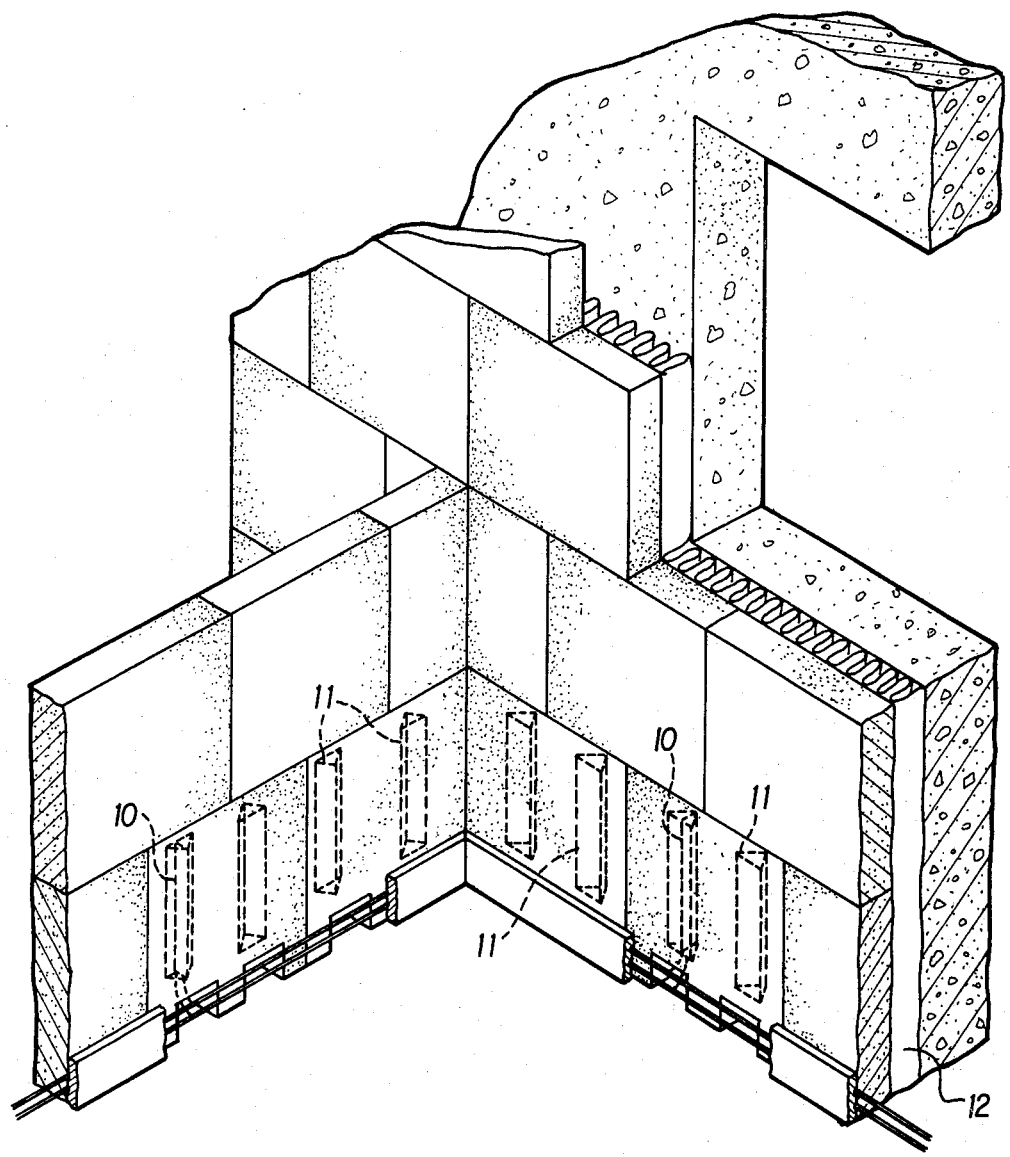

Finally, FIG. 5 depicts two portions of a partition in a section of the room to be heated. The panels according to the invention have been placed only at the bottom of the partition; a skirting board conceals the various recesses 5 or 13; the various heating elements 10 are connected to an electrical circuit which is concealed by the skirting board. In the case of one of the partitions, the panels according to the invention are themselves backed by an insulating material 12 which is itself placed against a concrete wall, whereas, in the case of the other partition, the panels according to the invention form the partition in and of themselves; the panels according to the invention are surmounted by conventional plaster panels which do not possess a cavity. It should, of course, be understood that these arrangements are given purely by way of illustration and that any other variation in the arrangement of the panels can be adopted.

The faces of the panels can have any possible shape, for example trapezoid, square or curvilinear, but are preferably rectangular. The panels can have markedly variable dimensions and, in the extreme case, a partition can consist of a single modular heating unit. However, for reasons of ease of handling and ease of transportation, the panels usually have relatively small dimensions. Of course, plaster panels of standard dimensions, such as panels of dimensions 50 cm × 66 cm and having a thickness which can vary from 6 to 10 centimeters, can also be used.

Figure 6:
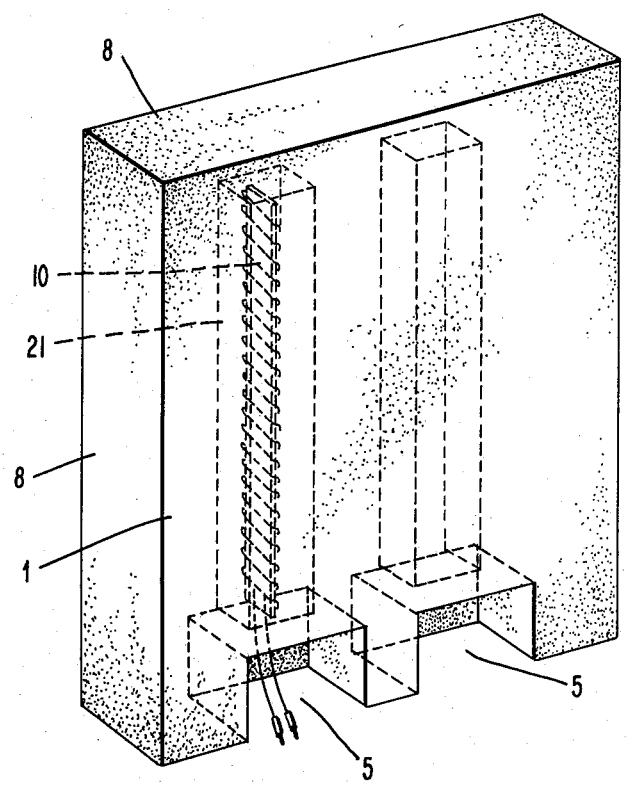
FIG. 6 is a perspective view of a constructional heating element in a vertical position having rectangular cavities according to the invention.
Figure 7:
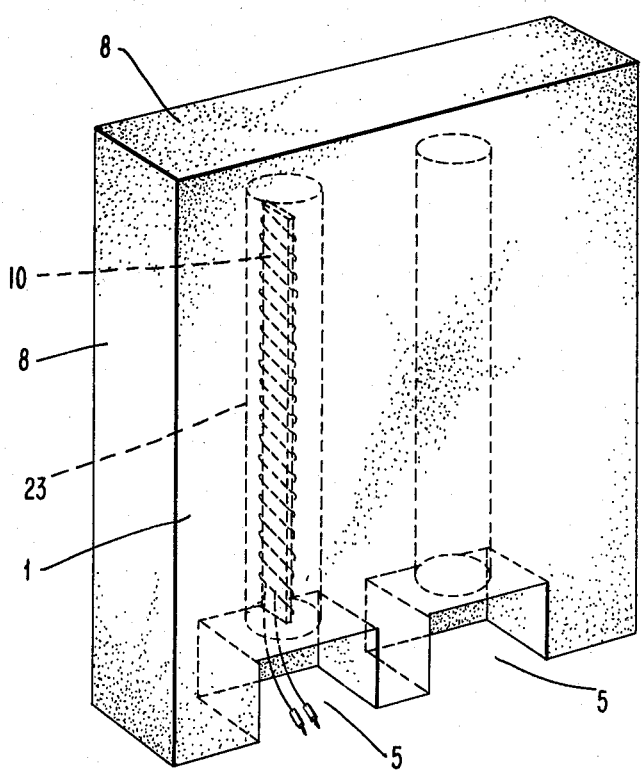
FIG. 7 is a perspective view of a constructional heating element in a vertical position having cylindrical cavities according to the invention.

The panels can possess several rectilinear cavities, preferably two per panel, which are arranged parallel to each other; at least one of the cavities contains an electrical heating element. The shape of these rectilinear cavities is generally that of a cylinder, see FIG. 7, (or prism) having a circular or polygonal transverse cross section. FIG. 1 shows a preferred variant in which the rectilinear cavities 2 have a triangular cross section 9. The rectilinear cavities may also have a rectangular cross section, see FIG. 6.

The rectilinear cavities in the panels can have an aperture at each of their ends or an aperture at only one end. In the case of a single aperture per rectilinear cavity (this being the preferred embodiment), all the apertures of the cavities of the same panel open out onto the same edge of the panel or the same border of a large dimensional face surface of the panel.

In the case of apertures at both ends, the cavities open out onto two opposite edges of the panel or two opposite borders of a face of a panel.

The rectilinear cavities generally and preferably possess but a single aperture.

The edge or border onto which the aperture of the said cavities open can be along the length or along the width of the panel. The length of the rectilinear cavities is typically between 50% and 95% of the dimension of the sides of the panel which are parallel to the cavities, but these values are not critical. The depth of the cavity, namely, the greatest dimension of the cavity perpendicular to the panel faces, can vary between 20% and 95% of the thickness of the panel.

According to one embodiment of the invention, the constructional units possess recesses 5 and 13 (FIGS. 1, 2 and 3) at the open ends of the rectilinear cavities. An advantage of this particular embodiment is that is makes it possible to introduce or withdraw the heating elements more easily. These recesses can have any desired shape, but most frequently have the shape of a parallelepiped, one face of which encloses the aperture of the rectilinear cavity to which the said recess corresponds. Each recess opens out onto at least one face of the panel (at the border) and also, optionally but preferably, onto the edge of the said panel, either on but a single side (as indicated by 5 in FIGS. 1 and 2) or on two adjacent sides (as indicated by 13 in FIG. 3) of the face of the said panel. The dimension of the recess, in the direction determined by the length of the rectilinear cavity, typically represents from 2% to 20% of the dimension of the panel parallel to this direction. The dimensions of the recess in the other two directions can vary widely; in simple terms, they must be at least equal to the corresponding dimensions of the aperture of the rectilinear cavity, so that the surface of the aperture is enclosed in a corresponding face of the recess.

According to another embodiment of the invention, a heat-reflecting material or device (reflector) is placed on at least two longitudinal faces of each cylinder (or prism) having a polygonal base, or on part of the longitudinal surface of each cylinder having a circular base, which can form the walls of the rectilinear cavities in which the electrical heating elements are located. An advantage of this embodiment is that it permits better orientation of the heat rays emitted by the electrical heating element.

This reflecting material or device is usually placed on the part of the cavity opposite the face of the panel which emits the heat evolved by the heating element. In a preferred embodiment of the invention, in which the rectilinear cavities have a triangular base (FIGS. 1 and 2), one longitudinal face 3 of the cavity is parallel to the face 1 of the panel, whereas the other two longitudinal faces of the cavity are covered with the reflecting material or device 7 which can be, for example, aluminum foil.

The panels forming the constructional unit according to the invention, which, in their most common variant, are made of plaster, can be produced by molding the complete panel in a single piece, including the rectilinear cavities and optional recesses. It is also possible to fabricate the panel in two component parts. A variant of this embodiment is illustrated in FIG. 4.

One of the said component parts 14 comprises the rectilinear cavity, while the surface of the other component part 15 then defines one of the inner faces of the rectilinear cavity. Furthermore, especially in the case of a rectilinear cavity having a triangular base, it can be of value to provide, in the second component part 15, a groove 16 which is parallel to the length of the rectilinear cavity and corresponds to the median part of the face of the said cavity which is formed by the second component part 15, the other faces of the cavity being formed by a groove of suitable cross section 17 (V-shaped in the case of a cavity having a triangular base) in the first component part 14.

The electrical heating element 10 used in the constructional units or modules according to the invention can consist of any type of insulated electrical resistance arranged on a support. The preferred electrical heating elements are those in which the support is sufficiently flexible to allow it to be introduced into a rectilinear cavity such as that described above; in fact, in the case of a partition such as that shown in FIG. 5, it is apparent that, when the electrical heating element 10 is flexible, it can be introduced into a recess of the type 5 or 13 through that part of this recess which opens onto the large dimensioned face surface of the panel; for an operation of this kind, it is obvious that the heating element 10 must be curved at the level of the recess, in order to be introduced into the rectilinear cavity.

In addition to possessing this property of flexibility, electrical heating elements 10 are preferably used which offer all (necessary) guarantees from the point of view of safety, and especially of electrical insulation, and are capable of withstanding prolonged use; this assumes that they consist of an electrically insulating material having high heat-resistance. It is for this reason that the electrical heating elements which are advantageously used are those consisting of a flexible band of macromolecular material (polymer or polycondensate), optionally containing fillers, one or more electrically resistant wires being encrusted with or embedded in this material, so as to form a web on each face of the strip.

According to a preferred embodiment of the invention, the electrical heating elements employed consist of:

(a) an electrically insulating material which itself consists of the combination of a reinforcing filler of elongate structure with a polyimide resin, and (b) an electrical resistance element which itself consists of at least one web of electrically conducting and electrically resistant wires.

Of course, the ends of these electric wires are provided with any suitable means for connecting same to a source of electrical power.

These electrical heating elements 10, as defined above, can also possess various other characteristics. The electrical wires are thus advantageously covered with an electrically insulating and heat-stable varnish which is preferably a polyamide-imide; the electrical wires are also advantageously arranged in two webs, the wires of one and the same web being parallel to one another and the wires running parallel, or preferably crosswise, from one web to the other.

Among the reinforcing fillers of elongate structure which can be used, there are mentioned, in particular, fillers of the flake type or fibrous type. As particular examples of reinforcing fillers of elongate structure, there are mentioned mica flake, asbestos fibers, glass or ceramic fibers, woven or non-woven fabrics (especially mats) of glass fibers, non-woven fabrics (especially felts) of asbestos fibers, or woven or non-woven fabrics of heat-stable synthetic fibers, for example, of an aromatic polyamide or of a polyamide-imide; the preferred fillers are asbestos fibers.

Among the polyimide resins which can be used, there are mentioned, in particular, those obtained by reacting a bis-imide of an unsaturated dicarboxylic acid with a polyamine. Resins of this kind are described in greater detail in U.S. Pat. No. 3,658,764 (hereby expressly incorporated by reference) and in the U.S. Pat. No. Re. 29,316 (also expressly incorporated by reference).

The use of such polyimides derived from bis-imides and polyamines is especially desirable for radiant heating elements, because these polyimides efficiently absorb the heat produced by the electrically resistant wires and then efficiently re-emit radiation at wavelengths suitable for heating.

The electrical heating elements based on polyimides of this kind, and also the processes for their preparation, are completely described in the French application for certificate of addition assigned to the assignee hereof, filed on June 23, 1977 under number 77/20,220, hereby expressly incorporated by reference in its entirety and relied upon.

The electrical wires used have a diameter which typically varies between 0.05 and 0.8 mm and the distance between same is typically between 1 and 10 mm. The material forming the wire can be chosen from among the metals or alloys which are conventionally employed for producing electrical resistances. Particularly valuable results have been obtained with nickel/-chromium wire.

As has already been stated, these electrical wires can be encrusted or coated with or even embedded in the electrically insulating material based on polyimide. The degree of encrustation is generally greater than 50%, and preferably greater than 80%. The term "degree of encrustation" denotes the proportion (measured linearly) of the diameter of the electrical wire which is below the surface of the electrically insulating material based on polyimide.

Among the electrical heating elements such as those described above, those which are especially suitable for the invention are in a sufficiently elastic form to be able to return to their rectilinear shape when a bending stress is no longer applied thereto. An element of this kind, particularly when it is a radiant element, is preferably arranged inside the rectilinear cavity in the panel along a plane which is perpendicular to the faces of the said panel. This arrangement (shown in FIGS. 1, 2 and 4) offers the advantage that it very greatly reduces the possibility of striking the electrical heating element when metal objects, such as nails, screws or pins, are introduced into the surface of the construction unit. In order to avoid any danger, even though this is rather unlikely in view of the arrangement of the heating element, it is possible to employ a variant of the invention, according to which the constructional units are provided with an additional safety device embedded in the surface of the panel, for example, an earthed metal mesh, so as to cut off the electric current in the event of an exceptional occurrence such as that envisaged above.

The constructional heating units according to the invention can be used for producing heating partitions. Series of units can be juxtaposed, either vertically so as to form inner partitions or linings for outer walls, or horizontally so as to form ceilings. The most frequent use is in vertical partitions. FIG. 5 therefore shows an example, which is in no way limiting, of a vertical assembly of the constructional units. It is possible to combine either constructional heating units alone, or, uniformly or non-uniformly alternating, heating units and units which are identical thereto but which are not provided with a heating element, or also homologous units which do not possess internal cavities. In particular, it can be advantageous to have modular heating units, according to the invention, only in the bottom row of a plurality of constructional units, the remainder of the successive rows consisting of units which do not possess an electrical heating element. It is also possible to have modular heating units and units without an electrical heating element within the same row. All types of other variants in arrangement can easily be effected, the choice of a particular variant generally being dictated by considerations of installation cost, ease of access to the heating elements for their positioning and replacement, by the value of the required heating power and also by the desire to have uniformly or non-uniformly distributed heating at any point in the partition.

For vertical partitions, it is very practical to install the constructional heating units in the lower part of the said partitions, the apertures of the rectilinear cavities in the various panels all being aligned and preferably being downwardly opening, and, assuming this to be the case, the heating elements are connected to the electricity supply at the level of the skirting boards, which, once they are in place, serve to conceal the recessess and wires. The resistances can be electrically connected in series or, preferably, in parallel. In FIG. 3, only some of the rectilinear cavities have been shown equipped with heating elements 10, but it is understood that as many cavities as desired can be provided with heating elements. In the case where it would be desired to heat both sides of the same partition, it is possible to orientate the reflecting material or device 11 in two opposite directions for the same panel, as shown in FIG. 5 in the case of cavities having a triangular base. It is also possible to alternate the orientation of the heating face from one panel to the other instead of alternating within the same panel.

On the other hand, if a partition consisting of constructional units according to the invention is used as a lining for an outer wall or as a division from another room which it is not desired to be heated, it is possible to arrange a layer of an insulating material 12, such as those usually employed in the building industry, on the rear face of the panel.

In order to further illustrate the present invention and the advantages thereof, the following specific example is given, it being understood that the same is intended only as illustrative and in nowise limitative.

EXAMPLE

The actual panel was made of plaster and consisted of a parallelepipedal base 14, of dimensions 800 mm × 350 mm and had a thickness of 70 mm, and a cover 15 of dimensions 800 mm × 350 mm and had a thickness of 70 mm, and a cover 15 of dimensions 800 mm × 350 mm and had a thickness of 30 mm. The panel was analogous to those shown in FIGS. 3 and 4.

The base possessed two longitudinal cavities which were parallel to one another and parallel to the larger dimension of the base. The cross section of these cavities was an isosceles triangle as shown in FIG. 4, the base of the triangles being formed by the inner face of the cover. With the panel placed on the edge and the cavities having a much greater vertical dimension, each cavity had only one aperture located at its lower end and opening out onto both the edge of the base and the border of the front face. The cavities had a length of 600 mm, a depth (dimension perpendicular to the faces of the base) of 37 mm and a width (base of the triangular cross section of the cavities) of 75 mm. A reflector consisting of a 50 micron thick aluminum foil was placed on the two V-shaped faces of the cavities. At the bottom of the base, the apertures of the two cavities were concealed by a wooden skirting board having the same 350 mm width as the base and the cover, a height of 110 mm and a thickness of 10 mm.

An electrical heating element was placed in each of the cavities in the panel. Each heating element consisted of a resistant wire made of nickel/chromium alloy, which had a length of 22 m and a diameter of 0.2 mm and was covered with a polyamide-imide varnish. This wire was encrusted on a support based on a polyimide and asbestos fibers (respective weight proportions 3/6); the polyimide was a product resulting from the polycondensation of 4,4'-N,N'-diphenylmethane-bis-maleimide and bis-(4-aminophenyl)-methane.

For each electrical heating element 10, the electrical resistance was 800 ohms and the power was 60 watts; the surface area was 315 cm$^2$ and the power evolved was therefore 0.19 watt/cm$^2$.

The front surface area of the heating panel was 2,410 cm$^2$ (surface area of the cover); the total power of the two construction units was 120 watts.

The heating density was, therefore, 500 watts per square meter of panel.

The temperature of the front surface of the panel was 50° C. at the level of the heating elements and 45° C. over the remainder of the surface of the panel.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A modular, constructional heating unit, which can be used for producing heating partitions by juxtaposition, said heating unit consisting essentially of a plaster based solid panel formed of at least one member; said panel having opposing, essentially parallel front and back face surfaces and a plurality of edge surfaces, and being provided with at least one internal, elongate, continuously rectilinear cavity, each such cavity being internally shaped into said solid panel between the front and back face surfaces thereof, the longitudinal axis of each such cavity being parallel to the face surfaces of the panel, each such cavity being exteriorly communicating through said panel at one of its ends, and each such cavity containing in the free space thereof an electrical heating element and means for coupling said heating element to an electrical power source, said electrical heating element being in the form of a flexible strip including an electrical wire embedded more than 50% in an electrically insulating material comprised of a macromolecular material and a reinforcing filler, said strip being arranged along a plane generally perpendicular to the face surface of the panel.

2. The constructional heating unit as defined by claim 1, wherein the panel is comprised of plaster.

3. The constructional heating unit as defined by claims 1 or 2, wherein the panel is provided with more than one cavity, each being parallel to the others.

4. The constructional heating unit as defined by claim 1, wherein the rectilinear cavity is generally cylindrical in shape.

5. The constructional heating unit as defined by claim 1, wherein the rectilinear cavity is generally polygonal in shape.

6. The constructional heating unit as defined by claim 1, wherein the rectilinear cavity is generally triangular in shape.

7. The constructional heating unit as defined by claim 1, wherein the panel member is square.

8. The constructional heating unit as defined by claim 1, wherein the cavity has a length of between 40% and 95% of the length of the sides of the panel member which are parallel thereto.

9. The constructional heating unit as defined by claim 1, comprising a cylindrical cavity having a polygonal base, and wherein at least two faces of this cavity are covered with heat-reflecting means.

10. The constructional heating unit as defined by claim 4, wherein the cylindrical cavity has a triangular base, one of the faces of such cylinder being parallel to one of the face surfaces of the panel and the other two faces being covered with the reflecting means.

11. The constructional heating unit as defined by claim 2, wherein that portion of the module comprised of plaster is a single molded element.

12. The constructional heating unit as defined by claim 2, wherein that portion of the module comprised of plaster comprises two component parts.

13. The constructional heating unit as defined by claim 12, wherein the rectilinear cavity has a cylindrical shape with a triangular base, the surface of one of the component parts forming the wall of one of the faces of the cavity, and the other two faces of the cavity being formed by a groove of V-shaped cross section, formed in the second component part.

14. The constructional heating unit as defined by claim 13, wherein the component part forming the wall of one of the faces of the cavity possesses a rectilinear groove, the direction of which is parallel to that of the cavity and which is located in the median region of the said face of the cavity.

15. The constructional heating unit as defined by claim 1, wherein the electrical heating element comprises:
   (a) an electrically insulating material comprising the combination of a reinforcing filler of elongate structure with a polyimide resin, and
   (b) an electrical resistor comprising two webs of electrically conducting and electrically resistant wires.

16. The constructional heating unit as defined by claim 15, wherein:
   (i) each of the two webs is arranged on either side of the support material (a);
   (ii) the wires of one and the same web are parallel to each other; and
   (iii) said wires are covered with an electrically insulating, heat-stable varnish.

17. The constructional heating unit as defined by claim 15, wherein the reinforcing filler of elongate structure is a material of flake type.

18. The constructional heating unit as defined by claim 17, wherein the reinforcing filler is selected from the group comprising mica, asbestos fibers, glass fibers ceramic fibers, woven fabrics non-woven fabrics, mats of glass fibers, and non-woven fabrics of asbestos fibers.

19. The constructional heating unit as defined by claim 15, wherein the polyimide resin is obtained by reacting a bisimide of an unsaturated dicarboxylic acid with a polyamine.

20. The constructional heating unit as defined by claim 1, wherein the panel member is trapezoidal.

21. The constructional heating unit as defined by claim 1, wherein the panel member is rectangular.

22. The constructional heating unit as defined by claim 1, each such cavity being exteriorly communicating through said panel to both an edge surface and face surface thereof at only one of its ends.

23. The constructional heating unit as defined by claims 1 or 22, the volume of external communication through said panel including a recess having a greater cross-section than that of the cavity.

24. The constructional heating unit as defined by claim 23, wherein the dimension of the recess in the direction determined by the length of the rectilinear cavity is between 2 and 20% of the dimension of the panel member parallel to the said direction.

25. The constructional heating unit as defined by claim 23, wherein same comprises at least two rectilinear cavities, each comprising a recess, and, for two of such cavities, the recesses located at the position of their apertures openly communicate onto one face surface and two sides which are adjacent to one another and to such face surface.

26. The constructional heating unit as defined by claim 22, comprising two rectilinear cavities.

27. The constructional heating unit as defined by claim 22, comprising three rectilinear cavities.

28. The constructional heating unit as defined by claim 23, comprising two rectilinear cavities.

29. The constructional heating unit as defined by claim 23, comprising three rectilinear cavities.

30. The constructional hearing unit as defined by claim 23, wherein the reinforcing filler of elongate structure is a material of fibrous type.

31. The constructional heating unit as defined by claim 1, wherein the panel is comprised of a member selected from the group consisting of cement, concrete and baked-clay brick.

* * * * *